UNITED STATES PATENT OFFICE.

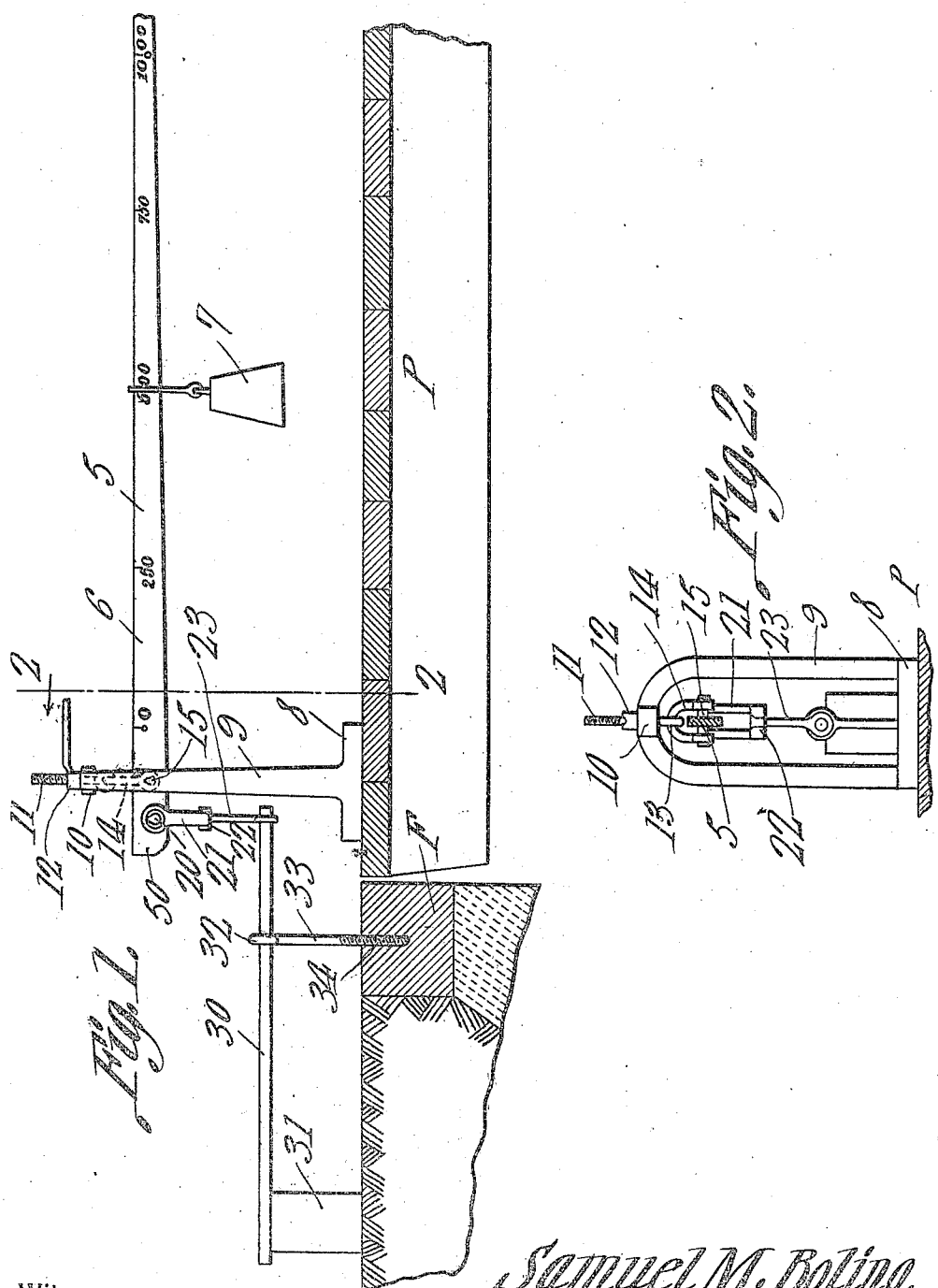

SAMUEL M. BOLING, OF OKLAHOMA, OKLAHOMA, ASSIGNOR OF ONE-HALF TO LOUIS W. BOZARTH, OF CHANDLER, OKLAHOMA

SCALE-TESTER.

1,013,732.

Specification of Letters Patent.

Patented Jan. 2, 1912.

Application filed December 28, 1910. Serial No. 599,775.

*To all whom it may concern:*

Be it known that I, SAMUEL M. BOLING, a citizen of the United States, residing at Oklahoma city, in the county of Oklahoma and State of Oklahoma, have invented a new and useful Scale-Tester, of which the following is a specification.

This invention relates to measuring instruments, and more especially to scale testers; and the object of the same is to produce a portable device by which large platform scales may be tested without removing them from their positions within the surrounding framework. This object I accomplish by a device constructed as hereinafter more fully described and claimed, and as shown in the drawings, wherein:—

Figure 1 is a sectional view through a portion of a platform scale and the surrounding framework thereof, showing my improved tester in position. Fig. 2 is a vertical sectional view on line 2—2 of Fig. 1.

In the drawings the letter P designates a platform scale such as ordinarily employed for weighing wagons with loads, and F is the surrounding framework thereof which is usually built into the ground or level with the surface thereof. The ordinary scale beam is connected with said platform by means not necessary to illustrate and describe herein. Heretofore when it was desired to test the accuracy of a scale of this kind, it was necessary for the operator to take an extremely heavy weight with him and carry it onto the platform of the scale, and then enter the shed or house wherein the scale beam was situated and ascertain if the weight of the load he had manually placed upon the platform was exactly or accurately indicated; after which it was necessary for him to again remove the load. This was quite irksome, and I have therefore produced the invention, described below, by means of which a comparatively small weight performs the service of the large one hitherto employed and the whole instrument is of such size and weight that it can be easily carried into place by one operator and removed after the testing operation.

Coming now more particularly to the present invention, I employ a scale beam in the form of a lever 5 provided with graduations 6 leading from zero up to one thousand or perhaps two thousand pounds if a scale of that capacity is to be tested, and on this beam is hung a weight 7 which is proportionate in size to the work to be done. The fulcrum for this beam is portable, and comprises a face plate 8 from which rises an arched standard 9 having a boss 10 at its top, and through the boss extends the shank of a screw eye 11 controlled by a nut 12 resting on the boss as seen. The eye 13 stands within the arch and supports an ordinary clevis 14 in whose eyes is hung a knife edge 15 which is fixed through the scale beam in the usual manner. Thus it will be seen that the fulcrum point can be raised or lowered by adjusting the nut. The short arm 50 of the lever carries a knife edge 20 upon which is hung the eyes of an inverted clevis 21, through whose bend 22 is swiveled the stem of a link 23 which therefore hangs from the short arm of the lever but is swivelly supported thereby. If the short arm of the scale beam extended beyond the platform of the scale it would be a comparatively easy matter to anchor it to some fixed object such as the framework F, but where the fulcrum has a rather large base as shown and which causes it to stand upright, the short arm of the lever may not extend beyond the platform and some form of anchor is necessary which leads over it so that the link shall hang vertically from the scale beam. In the drawings, I have shown one form of such anchor as comprising a bar 30 resting at its outer end upon a support 31 which may be a block or stone, passing between its ends through the eye 32 of an eye bolt 33 which is screwed as at 34 into the wooden portion of the framework F, and its inner end extending through the eye or lower end of the link. If the adjustment of the fulcrum by means of the nut 12 is not sufficient to accommodate the parts, it is clear that the eye bolt can be adjusted within the framework F and this adjustment in connection with the other will doubtless be sufficient. The inner end of the bar will extend over the platform of the scale as far as necessary, and the degree of its extent may be regulated by adjusting the support toward or from the platform by slipping the bar through the eye of the eye bolt.

In use, this improved tester is employed by first bringing the fulcrum and scale beam onto the platform of the scale and resting the base of the fulcrum thereon near its edge as shown; then setting up the support and extending the bar over the edge of the platform and passing its inner end through the link; and finally after the scale beam is caused by the link to stand normally horizontal, the operator adjusts the weight upon the scale beam until it reaches a predetermined point such as five hundred pounds as shown, and then looks at the scale beam of the scale to see if it indicates that figure. If so the scale is considered accurate, and the tester can be removed without the operator having to carry any extremely heavy weight either way. Obviously the entire tester is portable and can then be carried to the next scale.

What is claimed as new is:—

1. In a scale-tester a fulcrum adapted to rest removably on the platform of the scale, a lever, a weight hung on the long arm of said lever, a knife-edge through the lever between its long and its short arm, a clevis, the eyes of which embrace the extremities of said knife-edge, an adjustable connection between said clevis and fulcrum, a second knife-edge through the short arm of the lever, a clevis hung thereon, a link swiveled in said clevis and having an eye at its lower end, and an anchor consisting of a bar extending over the edge of the scale platform and through said eye in the link, and screw-controlled means for adjusting the height of said bar.

2. In a scale-tester, a fulcrum adapted to rest removably on the platform of the scale, a lever hung in said fulcrum, means for anchoring the outer arm of said lever, said anchoring means comprising a bolt inserted in the frame-work of the scale, a bar held horizontally by said bolt and over the platform of the scale, a support for the outer end of said bar, the opposite end of said bar being attached to the aforesaid outer arm of said lever, and a weight carried by the inner arm of said lever.

3. In a scale-tester a fulcrum adapted to rest removably on the platform of the scale, a lever having graduations, a weight hung on the graduated portion of said lever, a knife edge through the lever between its graduated portion and its short arm, a clevis whose eyes embrace the extremities of said knife edge, and adjustable connection between said clevis and fulcrum, a second knife edge through the short arm of the lever, a clevis hung thereon, a link swiveled in said clevis and having an eye at its lower end, an anchor consisting of a bar extending over the edge of the scale platform and through said eye in the link, and screw-controlled means for adjusting the height of said bar.

4. In a scale-tester, a fulcrum adapted to rest removably on the platform of the scale, a lever hung in said fulcrum, means for anchoring the outer arm of said lever, said anchoring means comprising an eye-bolt inserted in the frame-work of the scale, a bar extended horizontally through the eye of said eye-bolt, and over the platform of the scale, a support for the outer end of said bar remote from said frame-work, the opposite end of said bar being attached to the aforesaid outer arm of said lever, and a weight carried by the inner arm of said lever.

5. In a scale-tester, a fulcrum adapted to rest removably on the platform of the scale, a lever hung in said fulcrum, means for anchoring the outer arm of said lever, said anchoring means comprising an eye-bolt inserted in the frame-work of the scale, a bar extended horizontally through the eye of said eye-bolt and over the platform of the scale, a support for the outer end of said bar remote from said frame-work, a knife-edge through the short arm of the lever, a clevis whose eyes are hung on the knife-edge, a link swiveled through the bend of said clevis and its eye inclosing the inner end of said bar, and a weight carried by the inner arm of said lever.

In testimony that I claim the foregoing as my own, I have hereto affixed my signature in the presence of two witnesses.

SAMUEL M. BOLING.

Witnesses:
C. VAN LANINGHAM,
W. C. MCADOO.